(12) United States Patent
Kim et al.

(10) Patent No.: US 10,851,429 B2
(45) Date of Patent: Dec. 1, 2020

(54) MIXED SUGAR GRANULAR POWDER AND METHOD FOR PREPARING SAME

(71) Applicant: SAMYANG CORPORATION, Seoul (KR)

(72) Inventors: Go-Eun Kim, Gwangju (KR); Sung Won Park, Daejeon (KR); Su Youn Lim, Suwon-si (KR); Hye Jung Kim, Daejeon (KR); Chong Jin Park, Daejeon (KR); Kang Pyo Lee, Seoul (KR)

(73) Assignee: SAMYANG CORPORATION, Seoul (KR)

( * ) Notice: Subject to any disclaimer, the term of this patent is extended or adjusted under 35 U.S.C. 154(b) by 157 days.

(21) Appl. No.: 15/567,167

(22) PCT Filed: Apr. 28, 2016

(86) PCT No.: PCT/KR2016/004474
§ 371 (c)(1),
(2) Date: Oct. 17, 2017

(87) PCT Pub. No.: WO2016/182235
PCT Pub. Date: Nov. 17, 2016

(65) Prior Publication Data
US 2018/0179604 A1    Jun. 28, 2018

(30) Foreign Application Priority Data
May 13, 2015    (KR) ........................ 10-2015-0066926

(51) Int. Cl.
*C13K 13/00*    (2006.01)
*C13B 50/00*    (2011.01)
(Continued)

(52) U.S. Cl.
CPC .............. *C13K 13/00* (2013.01); *A23L 27/10* (2016.08); *A23L 27/30* (2016.08); *C13B 50/00* (2013.01); *C13K 1/00* (2013.01)

(58) Field of Classification Search
CPC ...................................................... C13K 13/00
See application file for complete search history.

(56) References Cited

U.S. PATENT DOCUMENTS 6,159,252 A † 12/2000 Schutte
2008/0292775 A1   11/2008 Prakash et al.
(Continued)

FOREIGN PATENT DOCUMENTS

| CN | 104026549 | 9/2014 |
|---|---|---|
| EP | 2156751 | 2/2010 |

(Continued)

OTHER PUBLICATIONS

Machine translation of WO2014/168018 Shintani et al downloaded on Mar. 13, 2019 (Year: 2019).*
(Continued)

*Primary Examiner* — Douglas B Call
(74) *Attorney, Agent, or Firm* — Lex IP Meister, PLLC

(57) ABSTRACT

The present invention relates to a granular form of mixed saccharide composition comprising a mixed saccharide containing psicose as a main ingredient and a method for preparing the same, and more particularly to a granule of a mixed saccharide containing psicose with improved sweetness quality and physical properties and a method for preparing the same.

16 Claims, 9 Drawing Sheets
Specification includes a Sequence Listing.

(51) Int. Cl.
*C13K 1/00* (2006.01)
*A23L 27/10* (2016.01)
*A23L 27/30* (2016.01)

(56) References Cited

U.S. PATENT DOCUMENTS

| | | | |
|---|---|---|---|
| 2009/0068710 A1* | 3/2009 | Izumori | C12P 19/02 |
| | | | 435/94 |
| 2011/0237790 A1* | 9/2011 | Lee | C07H 1/06 |
| | | | 536/127 |
| 2012/0076908 A1 | 3/2012 | Fujihara et al. | |
| 2012/0201878 A1* | 8/2012 | Lang | A61K 9/1652 |
| | | | 424/464 |
| 2014/0271746 A1† | 9/2014 | Woodyer | |
| 2014/0271747 A1† | 9/2014 | Woodyer | |
| 2016/0145651 A1* | 5/2016 | Kurihara | C12N 1/22 |
| | | | 435/162 |
| 2016/0213036 A1* | 7/2016 | Shen | A23L 2/44 |

FOREIGN PATENT DOCUMENTS

| | | | |
|---|---|---|---|
| JP | 54-35224 | | 3/1979 |
| JP | 62-074276 | | 4/1987 |
| JP | 06-038800 | | 2/1994 |
| JP | 2001/011090 | † | 1/2001 |
| JP | 2001-011090 | | 1/2001 |
| JP | 2007-535597 | | 12/2007 |
| JP | 2010-527609 | | 8/2010 |
| JP | 2013-138660 | | 7/2013 |
| KR | 10-0750072 | | 8/2007 |
| KR | 10-1041917 | | 6/2011 |
| KR | 10-2012-0033282 | | 4/2012 |
| KR | 10-1318422 | | 10/2013 |
| KR | 10-2014-0021974 | | 2/2014 |
| KR | 10-2014-0080282 | | 6/2014 |
| KR | 10-2015-0015030 | | 2/2015 |
| WO | 2006-093292 | | 9/2006 |
| WO | 2015005307 | * | 1/2015 |
| WO | WO2015005307 | * | 1/2015 |
| WO | 2015-028784 | | 3/2015 |
| WO | 2015/028784 A1 | † | 3/2015 |
| WO | 2015028784 | * | 3/2015 |

OTHER PUBLICATIONS

Hygroscopicity of Sugars and Sugar Mixtures John H. Dittmar et al. Ind. Eng. Chem., v 27, No. 3 (Year: 1935).*
Anonymous, "Powder mixture—Wikipedia", Wikipedia, Jan. 13, 2015, pp. 1-3, XP055518974.
K. D. Roe et al, "Glass Transition and Crystallization of Amorphous Trehalose-sucrose Mixtures", International Journal of Food Properties, vol. 8, No. 3, Sep. 1, 2005, pp. 559-574, XP055518803.
EPO, the extended European Search report of EP 16792881.1 dated Nov. 15, 2018.
J. Park et al., "Construction of Heat-inducible Expression Vector of Corynebacterium glutamicum and C. ammoniagenes: Fusion of λ Operator with Promoters Isolated from C. ammoniagenes", Journal of Microbiology and Biotechnology, vol. 18, No. 4, p. 639-647, Apr. 1, 2008.
Japan Society for Powder Engineering, Powder Technology Handbook, 2014, pp. 373-377.
Wikipedia, "Powder Mixtures", 3 pages, Accessed Dec. 18, 2018 (https://en.wikipedia.org/w/index.php?title=Powder_mixture&oldid=642374273), published Jan. 13, 2015.†
K.D. Roe, "Glass Transition and Crystallization of Amorphous Trehalose-sucros mixtures", pp. 559-574, published 2005, Int'l J. of Food Properties 8 (3).†

* cited by examiner
† cited by third party

[Fig. 1]
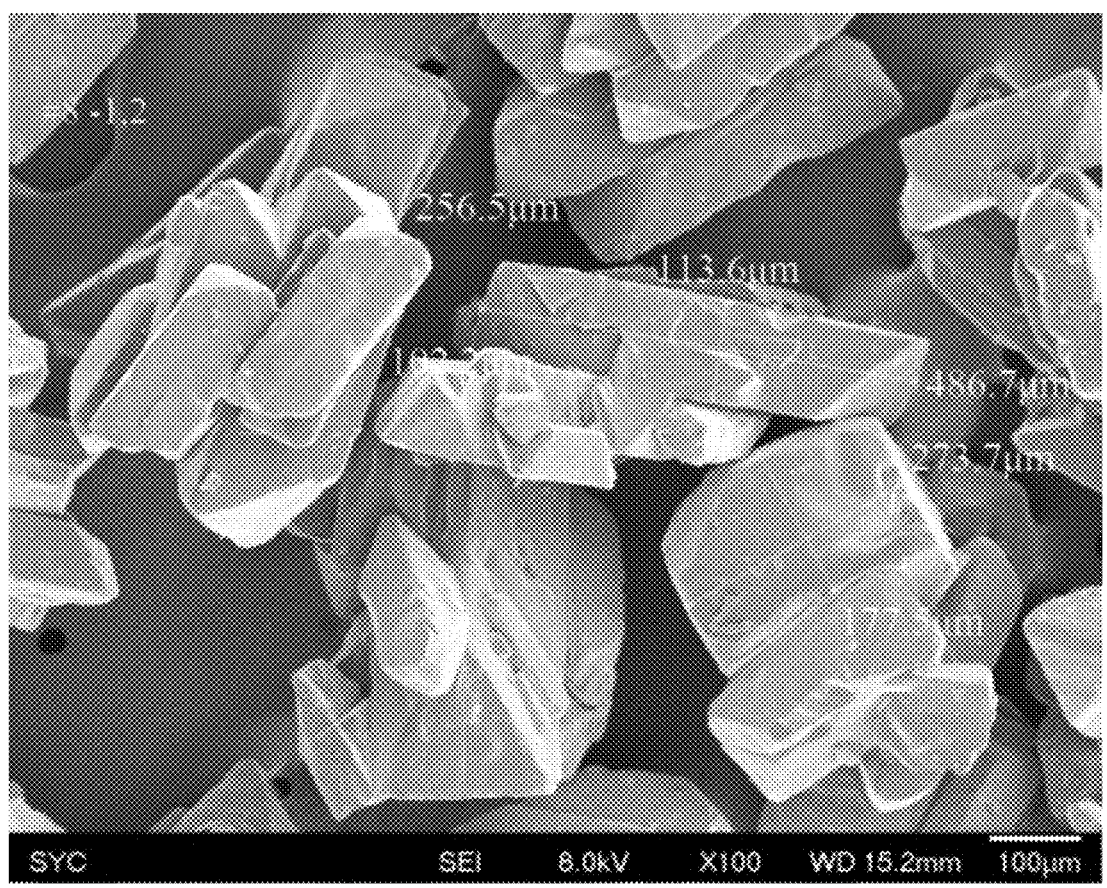

[Fig. 2]
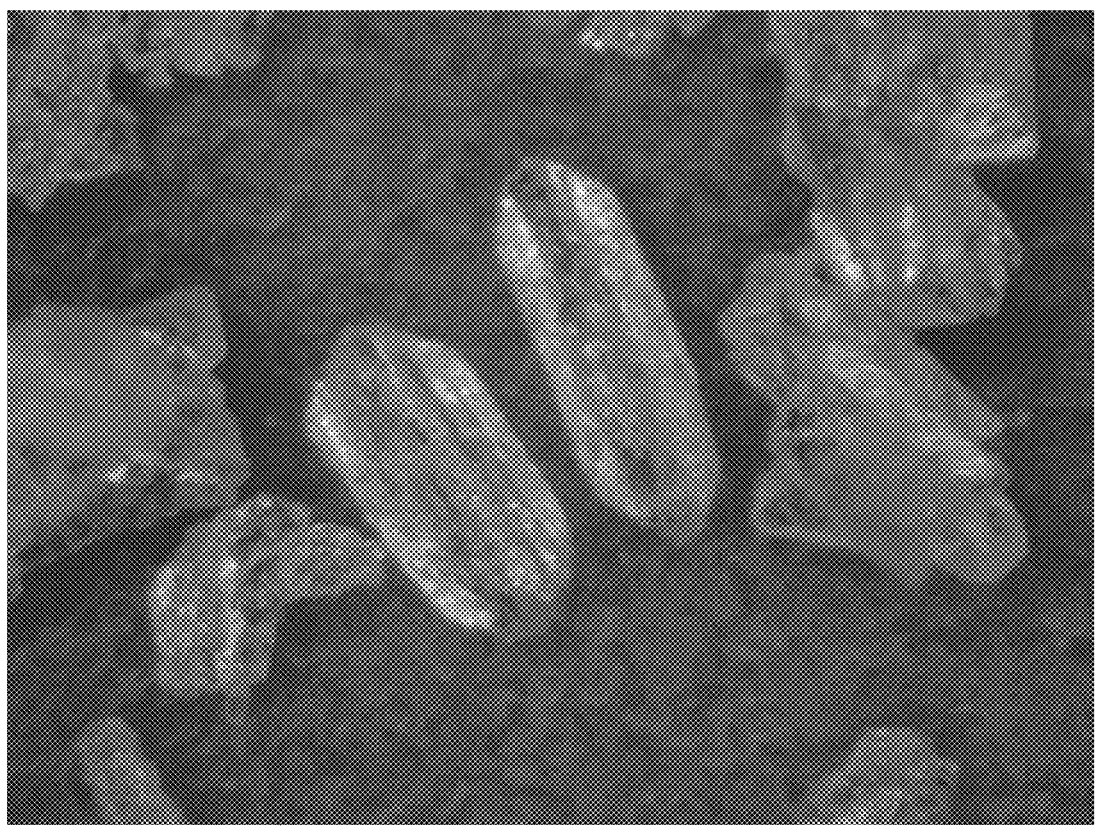

[Fig. 3]
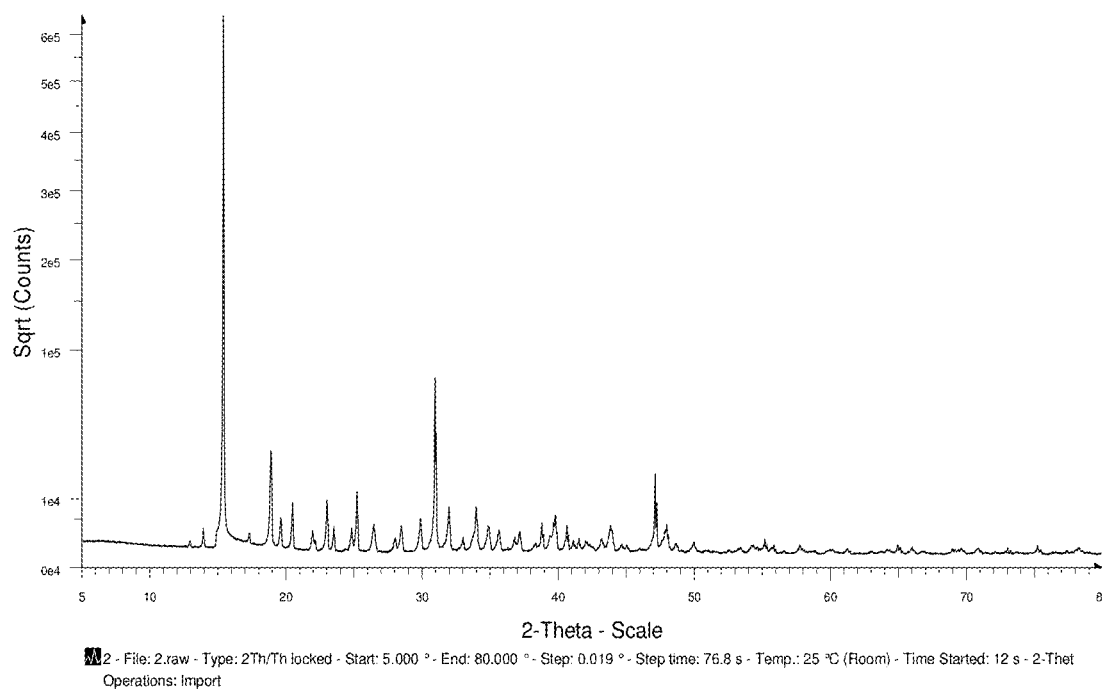

[Fig. 4]
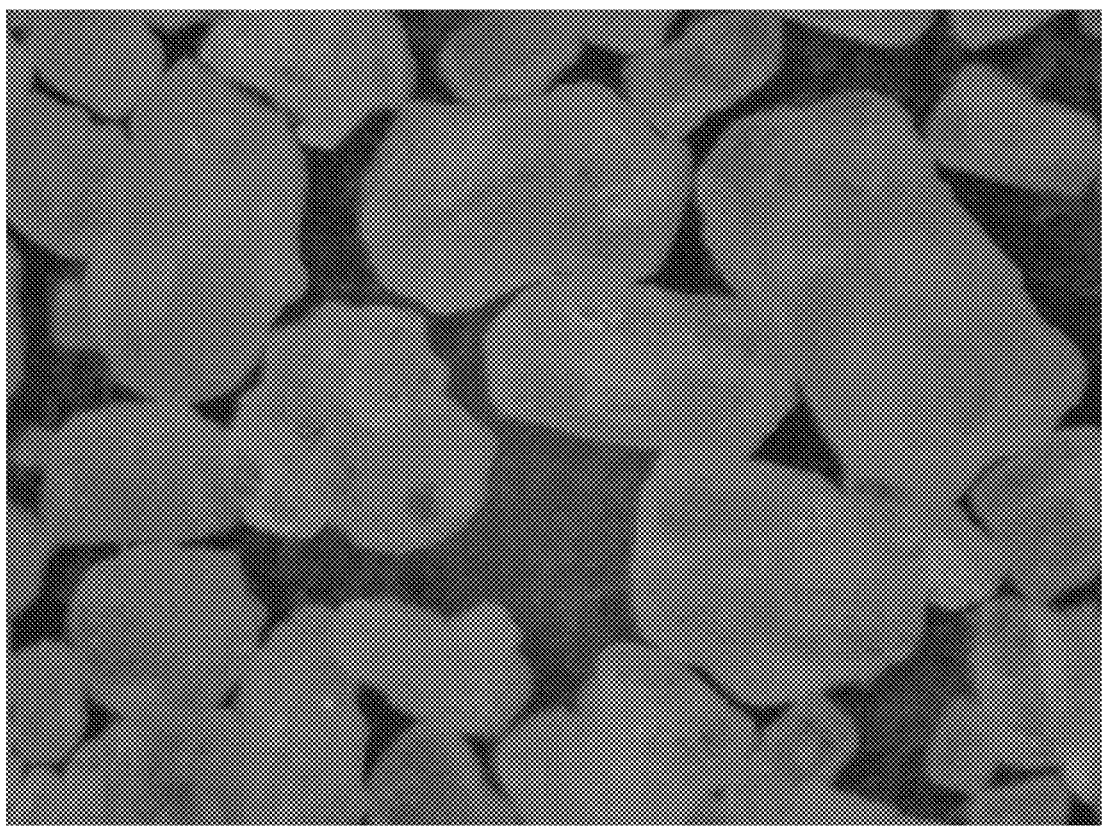

[Fig. 5]
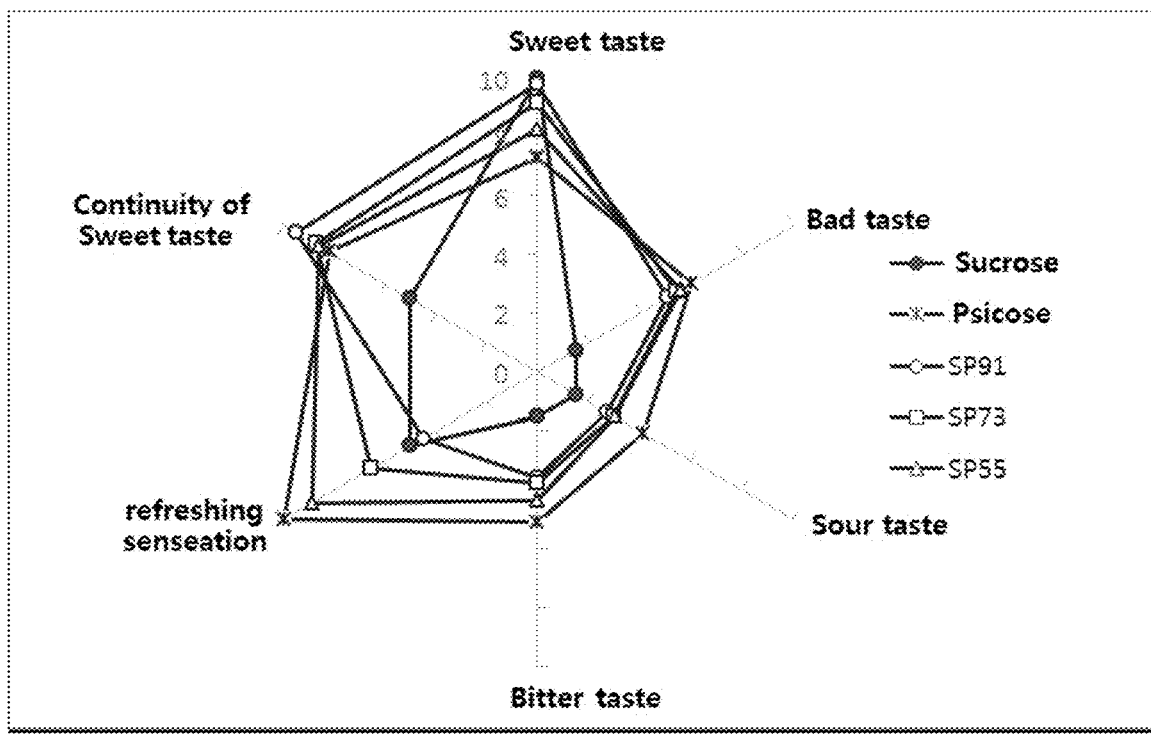

[Fig. 6]
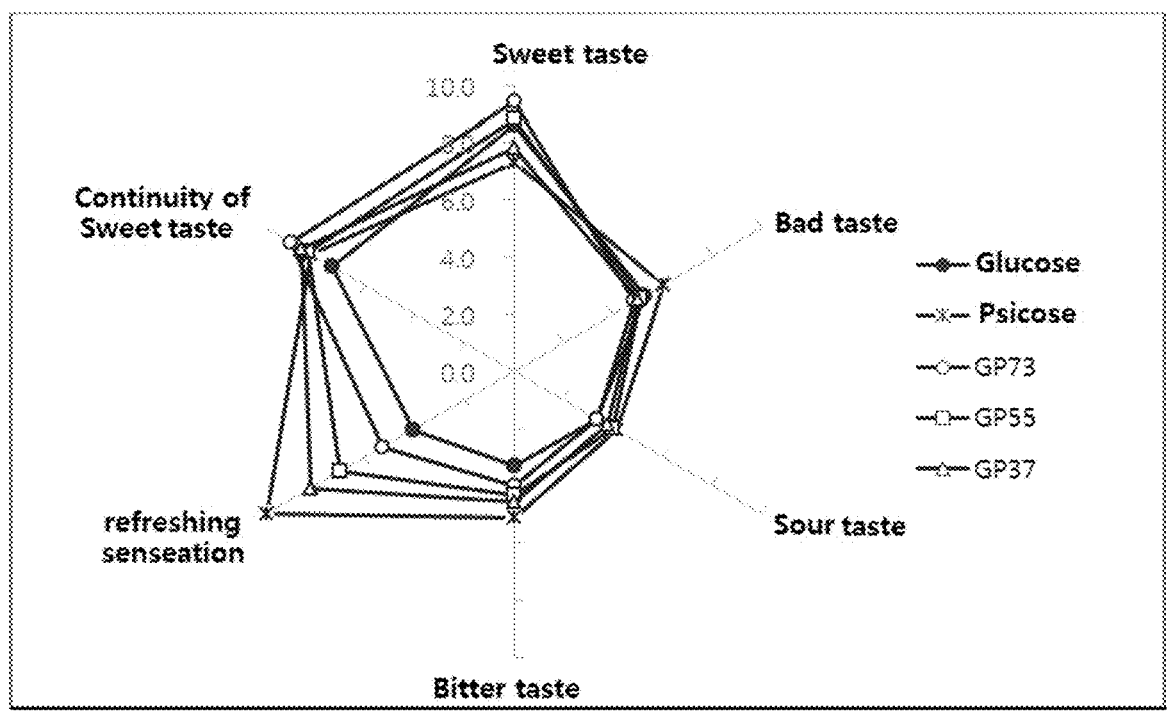
[Fig. 7]
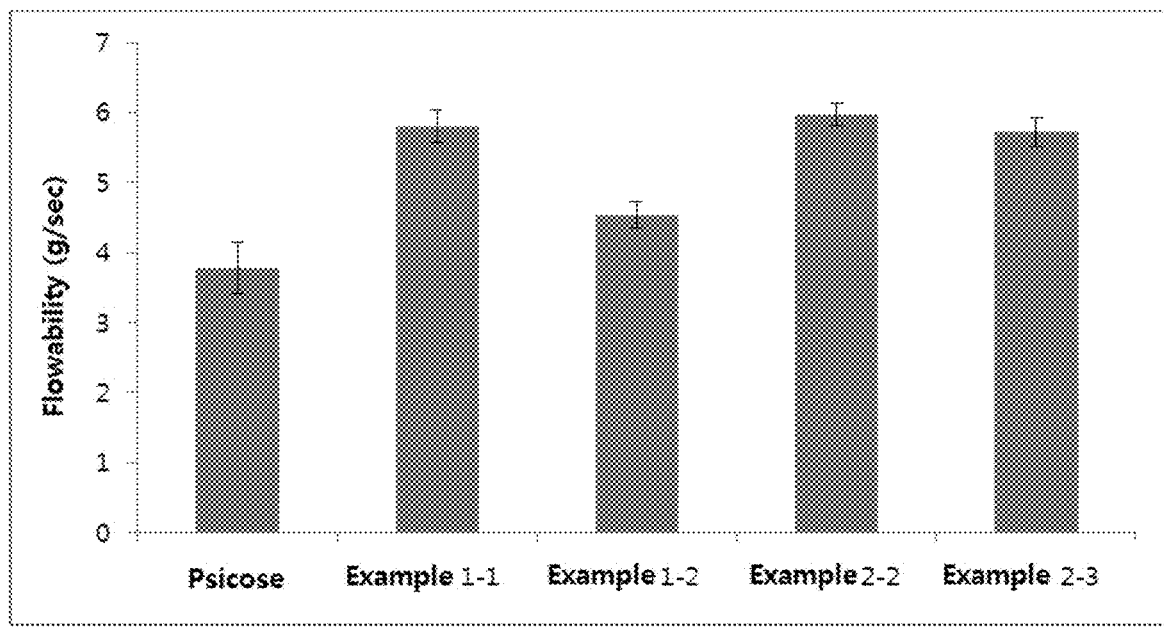

[Fig. 8]
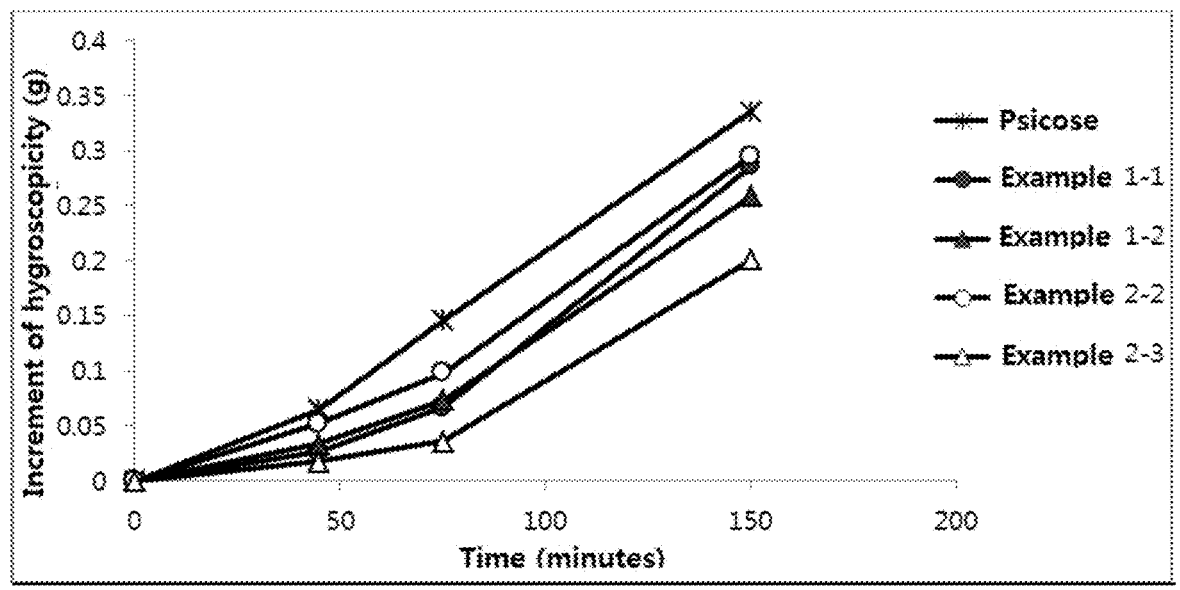

[Fig. 9]
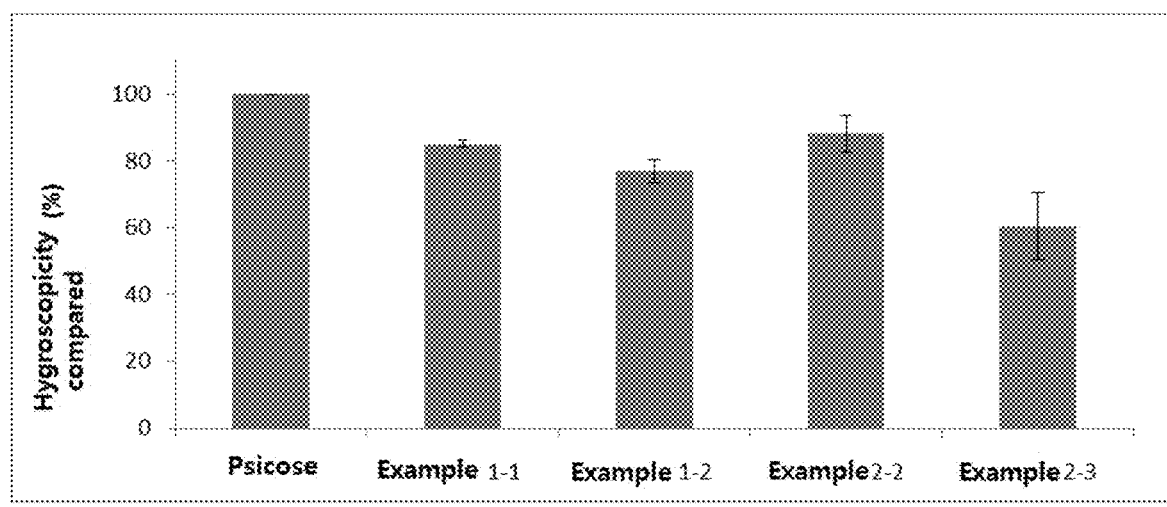

[Fig. 10]
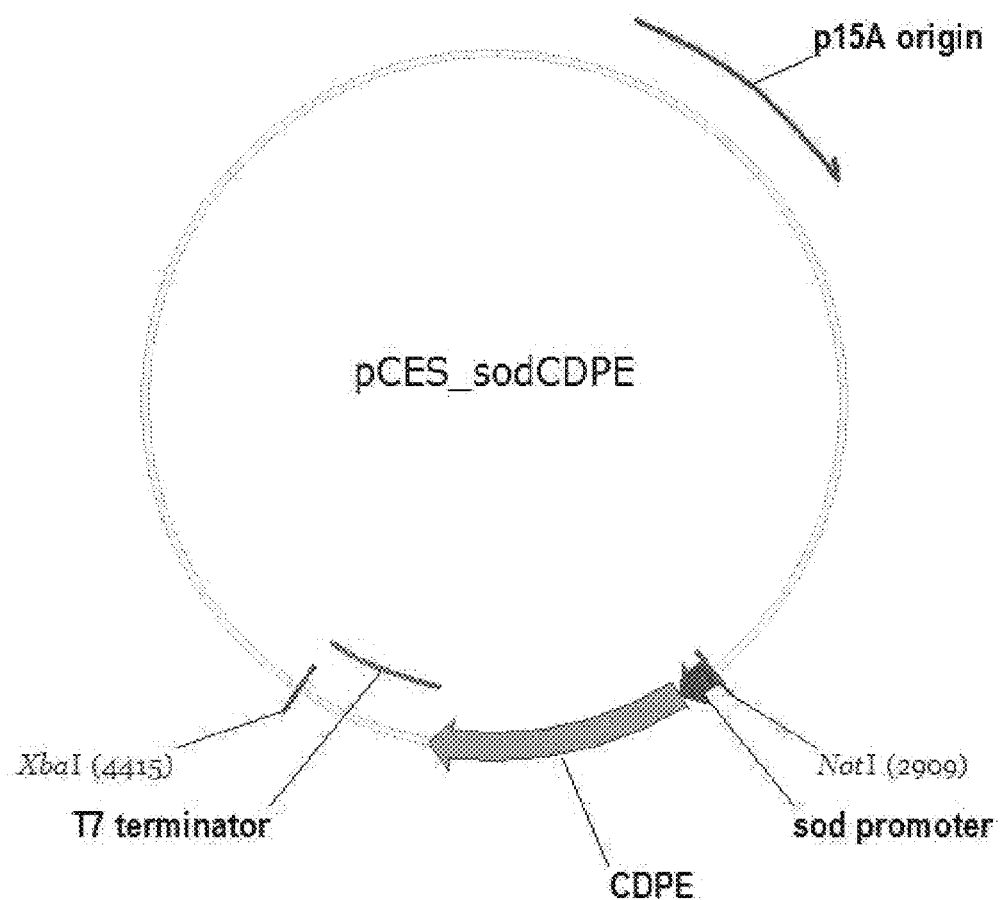

SEQUENCE LISTING

```
<160> NUMBER OF SEQ ID NOS: 9

<210> SEQ ID NO 1
<211> LENGTH: 356
<212> TYPE: DNA
<213> ORGANISM: Artificial Sequence
<220> FEATURE:
<223> OTHER INFORMATION: Synthetic (sod promoter (6))

<400> SEQUENCE: 1
aagcgcctca tcagcggtaa ccatcacggg ttcgggtgcg aaaaaccatg ccataacagg      60
aatgttcctt tcgaaaattg aggaagcctt atgcccttca accctactta gctgccaatt     120
attccgggct tgtgacccgc tacccgataa ataggtcggc tgaaaaattt cgttgcaata     180
tcaacaaaaa ggcctatcat tgggaggtgt cgcaccaagt acttttgcga agcgccatct     240
gacggatttt caaagatgt atatgctcgg tgcggaaacc tacgaaagga ttttttaccc      300
atggctgtat acgaactccc agaactcgac tacgcatacg acgaaaggat tacaaa         356

<210> SEQ ID NO 2
<211> LENGTH: 93
<212> TYPE: DNA
<213> ORGANISM: Artificial Sequence
<220> FEATURE:
<223> OTHER INFORMATION: Synthetic (Tac1 promoter (4))

<400> SEQUENCE: 2
tgacaattaa tcatcggctc gtatattgtg tggaattgtg agcggataac aatttcacac      60
aggaaacaga ttcccgggg aaaggattac aaa                                    93

<210> SEQ ID NO 3
<211> LENGTH: 112
<212> TYPE: DNA
```

```
<213> ORGANISM: Artificial Sequence
<220> FEATURE:
<223> OTHER INFORMATION: Synthetic (Tac2 promoter (4))

<400> SEQUENCE: 3
tgacaattaa tcatccggct cgtataatgt taacaatttg tggaattgtg agcggacaca      60
caggaaacag accatggaat tcgagctcgg tacccgggga aaggattaca aa            112

<210> SEQ ID NO 4
<211> LENGTH: 30
<212> TYPE: DNA
<213> ORGANISM: Artificial Sequence
<220> FEATURE:
<223> OTHER INFORMATION: Synthetic (Trc promoter (1))

<400> SEQUENCE: 4
tgacaattaa tcatcggcct cgtataatgt                                       30

<210> SEQ ID NO 5
<211> LENGTH: 7
<212> TYPE: DNA
<213> ORGANISM: Artificial Sequence
<220> FEATURE:
<223> OTHER INFORMATION: Synthetic (Ribosome binding region)

<400> SEQUENCE: 5 gaaagga                                                                 7

<210> SEQ ID NO 6
<211> LENGTH: 7
<212> TYPE: DNA
<213> ORGANISM: Artificial Sequence
<220> FEATURE:
<223> OTHER INFORMATION: Synthetic (Spacer sequence)

<400> SEQUENCE: 6 ttacaaa                                                                 7

<210> SEQ ID NO 7
<211> LENGTH: 289
<212> TYPE: PRT
<213> ORGANISM: Artificial Sequence
<220> FEATURE:
<223> OTHER INFORMATION: Synthetic (amino acid sequence of an enzyme
      protein originated from Clostridium scindens)

<400> SEQUENCE: 7
```

Met Lys His Gly Ile Tyr Tyr Ala Tyr Trp Glu Gln Glu Trp Ala Ala
 1               5                  10                  15

Asp Tyr Lys Arg Tyr Val Glu Lys Ala Ala Lys Leu Gly Phe Asp Ile
            20                  25                  30

Leu Glu Val Gly Ala Ala Pro Leu Pro Asp Tyr Ser Ala Gln Glu Val
        35                  40                  45

Lys Glu Leu Lys Lys Cys Ala Asp Asp Asn Gly Ile Gln Leu Thr Ala
    50                  55                  60

Gly Tyr Gly Pro Ala Phe Asn His Asn Met Gly Ser Ser Asp Pro Lys
65                  70                  75                  80

Ile Arg Glu Glu Ala Leu Gln Trp Tyr Lys Arg Leu Phe Glu Val Met
                85                  90                  95

Ala Gly Leu Asp Ile His Leu Ile Gly Gly Ala Leu Tyr Ser Tyr Trp
            100                 105                 110

Pro Val Asp Phe Ala Thr Ala Asn Lys Glu Glu Asp Trp Lys His Ser

```
        115                 120                 125
Val Glu Gly Met Gln Ile Leu Ala Pro Ile Ala Ser Gln Tyr Gly Ile
    130                 135                 140

Asn Leu Gly Met Glu Val Leu Asn Arg Phe Glu Ser His Ile Leu Asn
145                 150                 155                 160

Thr Ser Glu Glu Gly Val Lys Phe Val Thr Glu Val Gly Met Asp Asn
                165                 170                 175

Val Lys Val Met Leu Asp Thr Phe His Met Asn Ile Glu Glu Ser Ser
            180                 185                 190

Ile Gly Asp Ala Ile Arg His Ala Gly Lys Leu Leu Gly His Phe His
        195                 200                 205

Thr Gly Glu Cys Asn Arg Met Val Pro Gly Lys Gly Arg Thr Pro Trp
    210                 215                 220

Arg Glu Ile Gly Asp Ala Leu Arg Glu Ile Glu Tyr Asp Gly Thr Val
225                 230                 235                 240

Val Met Glu Pro Phe Val Arg Met Gly Gly Gln Val Gly Ser Asp Ile
                245                 250                 255

Lys Val Trp Arg Asp Ile Ser Lys Gly Ala Gly Glu Asp Arg Leu Asp
            260                 265                 270

Glu Asp Ala Arg Arg Ala Val Glu Phe Gln Arg Tyr Met Leu Glu Trp
        275                 280                 285

Lys
```

<210> SEQ ID NO 8
<211> LENGTH: 870
<212> TYPE: DNA
<213> ORGANISM: Artificial Sequence
<220> FEATURE:
<223> OTHER INFORMATION: Synthetic (modified nucleic acid sequence (1) of the enzyme protein of SEQ ID NO: 7)

<400> SEQUENCE: 8

```
atgaaacacg gtatctacta cgcgtactgg gaacaggaat gggcggcgga ctacaaacgt    60
tacgttgaaa aagcggcgaa actgggtttc gacatcctgg aagttggtgc ggcgccgctg   120
ccggactact ctgcgcagga agttaaagaa ctgaaaaaat cgcgggacga caacggtatc   180
cagctgaccg cgggttacgg tccggcgttc aaccacaaca tgggttcttc tgacccgaaa   240
atccgtgaag aagcgctgca gtggtacaaa cgtctgttcg aagttatggc gggtctggac   300
atccacctga tcggtggtgc gctgtactct tactggccgg ttgacttcgc gaccgcgaac   360
aaagaagaag actggaaaca ctctgttgaa ggtatgcaga cctggcgcc gatcgcgtct   420
cagtacggta tcaacctggg tatggaagtt ctgaaccgtt tcgaatctca catcctgaac   480
acctctgaag aaggtgttaa attcgttacc gaagttggta tggacaacgt taaagttatg   540
ctggacacct tccacatgaa catcgaagaa tcttctatcg gtgacgcgat ccgtcacgcg   600
ggtaaactgc tgggtcactt ccacaccggt gaatgcaacc gtatggttcc gggtaaaggt   660
cgtaccccgt ggcgtgaaat cggtgacgcg ctgcgtgaaa tcgaatacga cggtaccgtt   720
gttatggaac cgttcgttcg tatgggtggt caggttggtt ctgacatcaa agtttggcgt   780
gacatctcta aaggtgcggg tgaagaccgt ctggacgaag acgcgcgtcg tgcggttgaa   840
ttccagcgtt acatgctgga atggaaataa                                   870
```

<210> SEQ ID NO 9
<211> LENGTH: 870
<212> TYPE: DNA

```
<213> ORGANISM: Artificial Sequence
<220> FEATURE:
<223> OTHER INFORMATION: Synthetic (modified nucleic acid sequence(2) of
      the enzyme protein of SEQ ID NO:7)

<400> SEQUENCE: 9
atgaagcacg gcatctacta cgcatactgg gagcaggagt gggcagcaga ctacaagcgc      60
tacgttgaga aggcagcaaa gctgggcttc gacatcctgg aggttggcgc agcaccactg     120
ccagactact ccgcacagga ggttaaggag ctgaagaagt gcgcagacga caacggcatc     180
cagctgaccg caggctacgg cccagcattc aaccacaaca tgggctcctc cgacccaaag     240
atccgcgagg aggcactgca gtggtacaag cgcctgttcg aggttatggc aggcctggac     300
atccacctga tcggcggcgc actgtactcc tactggccag ttgacttcgc aaccgcaaac     360
aaggaggagg actggaagca ctccgttgag ggcatgcaga tcctggcacc aatcgcatcc     420
cagtacggca tcaacctggg catggaggtt ctgaaccgct tcgagtccca catcctgaac     480
acctccgagg agggcgttaa gttcgttacc gaggttggca tggacaacgt taaggttatg     540
ctggacacct tccacatgaa catcgaggag tcctccatcg gcgacgcaat ccgccacgca     600
ggcaagctgc tgggccactt ccacaccggc gagtgcaacc gcatggttcc aggcaagggc     660
cgcaccccat ggcgcgagat cggcgacgca ctgcgcgaga tcgagtacga cggcaccgtt     720
gttatggagc cattcgttcg catgggcggc caggttggct ccgacatcaa ggtttggcgc     780
gacatctcca agggcgcagg cgaggaccgc ctggacgagg acgcacgccg cgcagttgag     840
ttccagcgct acatgctgga gtggaagtaa                                     870
```

MIXED SUGAR GRANULAR POWDER AND METHOD FOR PREPARING SAME

TECHNICAL FIELD

The present invention relates to a granular form of mixed saccharide composition comprising a mixed saccharide containing psicose as a main ingredient and a method for preparing the same, and more particularly to a granule of a mixed saccharide containing psicose with improved sweetness quality and physical properties and a method for preparing the same.

BACKGROUND ART

Sugar is one of the representative sweeteners that add sweetness to food. Sugar has been considered as the most preferable sweetener which improves the taste of food and increases the taste as added in various foods and processed foods, etc. from the past, since it has excellent sweetness. However, recently, problems have been raised as the harmfulness of sugar continues to be revealed, and specifically, excessive intake of sugar is pointed out as a major cause of various kinds of diseases such as obesity, diabetes as well as cavities, etc. Therefore, the need to develop a sweetener that can replace sugar is becoming global issue.

Accordingly, there is a continuous need to develop a more improved substitute sweetener, which has sweetness enough to replace sugar and is low in calorie, and moreover, is not a sweetener that prevents excessive intake of sugar by merely inhibiting absorption of saccharides.

D-psicose is one kind of rare saccharides that can be enzymatically produced by epimerase from D-fructose, which is contained in a small amount in molasses or isomerized glucose syrup, and it is expected to be applied to various foods, since physiological functions such as inhibiting accumulation of body fat are expected and moreover, it has sweetness of 70% of sugar and almost zero calorie and excellent solubility.

However, if D-psicose is used as a food sweetener, the amount of D-psicose used is increased in order to obtain the required level of sweetness in that psicose has a relatively low sweetness as compared with sugar, and there is a problem such as excessively high thickness of psicose or late increase of sweetness, etc., and therefore, the mixed use is more preferable.

Accordingly, a method to achieve desired sweetness quality by preparing a mixed saccharide by adding different kinds of saccharides into psicose or forming a chemical bond has been attempted, and for example, there is a method of adding a high-intensity sweetener such as steviol glycoside, sucralose, aspartame, *Siraitia grosvenorii* extract, licorice extract, thaumatin and agave syrup, etc.

One example of a method for preparing a mixed saccharide can be observed by taking a glance at a method of simply 'mixing' crystalline sugar and powdered xylose as a method of adding xylose into sugar. However, in case of a particulate or powdery food composition which is composed by mixing two or more ingredients, 'whether ingredients are homogenously mixed or not' and 'whether ingredients are re-separated after mixing or not' are very important problems. That is because unexpected side effects can be led as overall intended mixing proportion cannot be achieved at the particular site, if not uniform generally or re-separation occurs in a mixed saccharide product, so that a certain ingredient is distributed in a particular site a lot and a different ingredient is distributed in another site a lot.

The problem of maintaining uniformity and preventing re-separation for such a mixture of saccharides is an important problem for manufacturers of particulate or powdery products, and it could be distributed as a particulate or powdery food, if a solution to that is accompanied.

DISCLOSURE

Technical Problem

An object of the present invention is to provide a mixed saccharide granule comprising psicose and a method for preparing the same, which solve a problem that the finer the sugar powder particle is, the lower the flowability is, thereby lowering the lower the convenience in use on the process aspect, and it is difficult to maintain the powder state due to the hygroscopicity of psicose, and heterogeneous mixing or occurrence of re-separation, as one of the problems of the prior art.

Another object of the present invention is to provide a mixed saccharide granule comprising psicose with improved physical properties and sweetness quality of only psicose and a method for preparing the same.

Further object of the present invention is to provide a mixed saccharide granule and a method for preparing the same, which can form a mixed saccharide granule with a uniform distribution while being less influenced by moisture and improve dispersibility and flowability to enable various packaging.

Technical Solution

An embodiment of the present invention relates to a mixed saccharide granule comprising (a) a first saccharide powder containing psicose, and (b) a second saccharide powder which has 30 to 170 of a ratio of an average particle diameter or preferably 90 to 170 of the ratio, based on 100 of an average particle diameter of the first saccharide powder, and is at least one selected from the group consisting of monosaccharides other than psicose and disaccharides, and a method for preparing the same.

Hygroscopicity of the mixed saccharide granule according to the present invention is 90 or less, for example, 50 to 90, based on 100 of hygroscopicity of psicose powder. In addition, the flowability of the mixed saccharide granule is 120 to 200, 120 to 195, 120 to 190, 120 to 185, preferably 120 to 180, based on 100 of the flowability of the psicose powder. The hygroscopicity and flowability of the mixed saccharide granule may be specified by various methods in the art, but not limited to a particular method.

Another embodiment of the present invention relates to a method for preparing a mixed saccharide granule comprising a step of granulating by adding a binding agent into (a) the first saccharide powder containing psicose, and (b) the second saccharide powder which has 30 to 170 of a ratio of an average particle diameter, based on 100 of an average particle diameter of the first saccharide powder, and is one or more kinds selected from the group consisting of monosaccharides other than psicose and disaccharides.

One additional embodiment of the present invention is a food composition comprising the mixed granular sugar, which is sweetened food, drugs, oral composition, etc., and examples of food include general composition of sweetness products such as beverages, candies, ices, yogurt, chocolates, etc. Particularly, an effective use for powdery food (instant powdery food) and powdery formulations (vitamin, lactobacillus powder, extract powder, etc.) is possible.

Granulation (granules) is to make drugs or foods as a granular form, which means to prepare particles of large particular diameter by equally mixing and drying the powdery mixture of the granular form itself or adding a binding agent. The mixed saccharide granule of the present invention has solved problems of lowered convenience in use occurred in the processing aspect because the finer the sugar powder particle is, the worse the flowability, difficulty of maintaining a powdery state due to hygroscopicity of psicose, and occurrence of heterogeneous mixing or reseparation, and the psicose with improved physical properties and sweetness quality than a single psicose. In addition, the mixed saccharide granule of the present invention is advantageous in that it can form a mixed saccharide granule with uniform distribution while being less influenced by moisture and dispersibility and flowability are improved to enable various packaging.

Hereinafter, the present invention will be described in more detail.

The present invention relates to a mixed saccharide granule comprising (a) the first saccharide powder containing psicose, and (b) the second saccharide powder which has 30 to 170 of a ratio of an average particle diameter, based on 100 of an average particle diameter of the first saccharide powder, preferably 90 to 170 of the ratio, and is one or more kinds selected from the group consisting of monosaccharides other than psicose and disaccharides.

Hygroscopicity of the mixed saccharide granule according to the present invention is 90 or less, for example, 50 to 90, based on 100 of hygroscopicity of psicose powder. In addition, the flowability of the mixed saccharide granule is 120 to 200, 120 to 195, 120 to 190, 120 to 185, preferably 120 to 180, based on 100 of the flowability of the psicose powder. The hygroscopicity and flowability of the mixed saccharide granule may be specified by various methods in the art, but not limited to a particular method.

The average particle diameter of the mixed saccharide granule may be 100 to 250, based on 100 of the average particle diameter of psicose, which is the first saccharide powder. In addition, the average particle diameter of the first saccharide powder may be 50 to 300 μm, and the average particle diameter of the second saccharide powder may be 50 to 700 μm. The first saccharide powder and the second saccharide powder may be subjected to classification treatment before granulation to reduce the standard deviation of the average particle diameter.

In one embodiment of the present invention, in the mixed saccharide granule, the mixed weight ratio of the first saccharide powder and the second saccharide powder (the first saccharide powder:the second saccharide powder) may be 70:30 to 5:95, for example, 50:50 to 10:90, considering giving a physiological activity effect of psicose, and improvement of flowability and sweetness quality of the granule.

The powder source may comprise the first saccharide powder and, the second saccharide powder comprising one or more kinds selected from the group consisting of monosaccharides other than psicose and disaccharides.

The psicose may be added as powder, or a mixed saccharide including together with other saccharides except psicose. The psicose may use psicose powder, for example, 90% or higher purity of psicose as powder, or be a mixed saccharide comprising additional other saccharides than psicose, and examples of the mixed saccharide may further comprise at least one selected from the group consisting of fructose, glucose, and oligosaccharide. The mixed saccharide may contain 1 to 99.9 parts by weight of psicose based on 100 parts by weight of the total solid content of the mixed saccharide, and may further comprise at least one selected from the group consisting of fructose, glucose, and oligosaccharide.

The specific example of the mixed saccharide containing psicose may comprise 2 to 55 parts by weight of psicose, 30 to 80 parts by weight of fructose, 2 to 60 parts by weight of glucose, and 0 to 15 parts by weight of oligosaccharide, based on 100 parts by weight of the total solid content of the mixed saccharide, and may not contain oligosaccharide. The psicose, fructose and glucose are preferably all D type-isomers.

The psicose may be prepared according to a chemical synthesis, or a biological method using a psicose epimerase, or preferably the biological method. Thus, the psicose may be prepared by reacting a composition for producing psicose containing at least one selected from the group consisting of a psicose epimerase, a microbial cell of strain producing the epimerase, a culture of the strain, a lysate of the strain, and an extract of the lysate or culture, with a fructose-containing raw material.

In one embodiment of the present invention, as a method for preparing psicose according to a biological method, it may be prepared by culturing a strain producing a psicose epimerase or a recombinant strain in which a gene encoding a psicose epimerase is introduced, and reacting a psicose epimerase obtained thereby with a fructose-containing raw material. The response of the psicose epimerase and the fructose-containing raw material may be conducted as a liquid state or a solid state using an immobilized enzyme.

Otherwise, it may be prepared by obtaining a strain producing a psicose epimerase or a recombinant strain in which a gene encoding a psicose epimerase is introduced, and reacting a composition for producing psicose containing one or more kinds selected from the group consisting of a psicose epimerase, a microbial cell of strain producing the epimerase, a culture of the strain, a lysate of the strain, and an extract of the lysate or culture with a fructose-containing raw material. It may be conducted as a liquid state reaction or a solid state reaction using an immobilized microbial cell when psicose is prepared by using a microbial cell of the strain producing a psicose epimerase.

In the specific embodiment of the present invention, a strain producing a psicose epimerase may be a strain which has a high stability and can produce a psicose epimerase with high yield. The recombinant strain may use various host cells, for example, *E. coli*, *Bacillus* sp. strain, *Salmonella* sp. strain and *Corynebacterium* sp. strain, etc., but preferably it may be *Corynebacterium* sp. strain, which is a GRAS strain, and may be *Corynebacterium glutaricum*.

In case of using a recombinant strain, a psicose epimerase can use an encoding gene of enzymes derived from various strains, and for example, it may be an enzyme derived from *Treponema primitia* disclosed in Korean Patent Publication No. 2014-0021974, an enzyme derived from *Ruminococcus torques* disclosed in Korean Patent Publication No. 2014-0080282 and an enzyme derived from *Clostridium scindens* disclosed in Korean Patent No. 10-1318422, and may also be an enzyme derived from *Ensifer adhaerens*.

In one specific embodiment, a psicose epimerase according to the present invention may be an enzyme derived from *Clostridium scindens*. The enzyme derived from *Clostridium scindens* may comprise an amino acid sequence of SEQ ID NO: 7, and may be encoded by a base sequence comprising a nucleic acid sequence of SEQ ID NO: 8 or SEQ ID NO: 9. The nucleic acid sequence of SEQ ID NO:

8 is *E. coli* optimized nucleic acid sequence, and SEQ ID NO: 9 is a nucleic acid sequence modified appropriately for *Corynebacterium*.

In the preparation of a recombinant strain according to one embodiment of the present invention, expression of an enzyme can be regulated using a regulatory sequence positioned on the top of the nucleic acid sequence encoding psicose epimerase, and the regulatory sequence essentially comprises a transcriptional promoter, and it may further comprise a ribosome-binding region and/or a spacer sequence. The elements constituting the regulatory sequence may be directly linked or linked by including one or more linkers of a nucleic acid sequence having 1 to 100 bases, for example, 5 to 80 bases.

In one specific embodiment, the transcriptional promoter may be a nucleic acid molecule expressing a nucleic acid sequence encoding a psicose epimerase in a *Corynebacterium* sp. strain, but may be tac1, tac2, trc, sod promoter.

The sod promoter is derived from *Corynebacterium glutaricum*, and preferably comprises the nucleic acid sequence of SEQ ID NO: 1 as a core region. The trc promoter is an *E. coli*-derived promoter and is prepared by the combination of trp promoter and lac UV5 promoter. The tac1 promoter is an *E. coli*-derived promoter and is prepared by the combination of trp promoter and lac UV5 promoter. The tac2 promoter is an *E. coli*-derived promoter and is prepared by the combination of trp promoter and lac UV5 promoter, and is an optimized form by modifying the sequence of Tac 1 promoter.

The ribosome binding region and spacer may be chemically linked directly or indirectly linked by interposing a linker nucleic acid sequence in between. In one embodiment of the present invention, the ribosome binding region and spacer sequence may comprise one oligonucleotide sequentially linked in the 5' to 3' order. The nucleic acid sequences of promoter sequence, ribosome binding region and spacer sequence according to the one embodiment of the present invention is shown in the following Table 1. The bold underlined portions in Table 1 indicate ribosome binding region, spacer sequence, linker sequence, etc. in the regulatory sequence.

invention, the combination of a transcriptional promoter or a regulatory sequence with a gene encoding a psicose epimerase, and all of tac1, tac2, trc, trip, sod promoters can provide more than adequate protein expression with the psicose epimerase used in the present invention, and particularly, when sod promoter is used, it is more preferable, as the result that protein folding is robust and thermal stability is high can be obtained.

A method for producing psicose using a recombinant strain, etc. may be conducted by methods disclosed in Korean Patent Publication No. 2014-0021974, Korean Patent Publication No. 2014-0080282 and Korean Patent No. 10-1318422, but not particularly limited thereto.

In the method for producing psicose, for effective production of psicose, the concentration of fructose used as a substrate may be 40 to 75% (w/v), for example, 50 to 75% (w/v) based on the total reactants. Since when the concentration of fructose is lower than the above range, the economy is lowered, and when it is higher than the above range, the fructose is not dissolved well, the concentration of fructose is preferable within the above range. The fructose may be used in the form of a solution dissolved in a buffer solution or water (for example, distilled water).

The second saccharide powder according to the present invention may be one or more kinds selected from the group consisting of glucose, sugar, lactose, maltose, galactose, tagatose, xylose, mannose, allose and fructose specifically. Considering sweetness quality, the second saccharide powder is preferably sugar and glucose, and considering use or functionality, it may further comprise various saccharides. As the second saccharide powder is present in the form of a crystal or powder, there is no problem in preparing a mixed saccharide as long as it meets the particle diameter conditions proposed in the present invention. For example, the glucose may be anhydrous glucose or hydroglucose. The sugar may be white sugar, brown sugar, etc. according to the refinement degree, and may be refined sugar, granulated sugar, caster sugar, and powder sugar according to the average particle diameter.

The mixed saccharide granule according to the present invention may further comprise a binding agent of the sugar

TABLE 1

| SEQ ID NO. | Sequence (5'→3') | name |
|---|---|---|
| 1 | aagcgcctcatcagcggtaaccatcacgggttcgggtgcgaaaaaccatgccataacaggaatgacctttcgaaaattgaggaagccttatgccatcaaccctacttagctgccaattattccgggcngtgaccgctacccgataaataggtcggctgaaaaatttcgttgcaatatcaacaaaaaggcctatcattgggaggtgtcgcaccaagtactttttgcgaagcgccatctgacggattttcaaaagatgtatatgctcggtgcggaaacctacgaaaggattttttacccatggctgtatacgaactcccagaactcgactacgcatacgacgaaaggattacaaa | Sod promoter |
| 2 | tgacaattaatcatcggctcgtatattgtgtggaattgtgagcggataacaatttcacacaggaaacagaattcccggggaaaggattacaaa | tac 1 promoter |
| 3 | tgacaattaatcatccggctcgtataatgttaacaatttgtggaattgtgagcggacacacaggaaacagaccatggaattcgagctcggtacccggggaaaggattacaaa | Tac2 promoter |
| 4 | tgacaattaatcatcggcctcgtataatgt | trc promoter |
| 5 | gaaagga | Ribosome binding region |
| 6 | ttacaaa | Spacer sequence |

It is preferable that the psicose epimerase according to the present invention is excellent in enzyme activity and thermal stability, and in the specific embodiment of the present powder, and the content of the binding agent in the total weight of the finally obtained mixed saccharide granule may be 0.1 to 5% by weight. The example of the binding agent may be one or more kinds selected from the group consisting of water, $C_1$-$C_6$ alcohol, aqueous solution of $C_1$-$C_6$ alcohol, maltodextrin, indigestible maltodextrin, Hydroxypropyl methylcellulose (HPMC) and starch.

The granulating step may be carried out by mixing and drying the first saccharide powder and the second saccharide powder, or by fluidizing in a fluidized bed granulator, and in the granulating process, the binding agent may be added so that the content of the binding agent in the total weight of the mixed saccharide granule is 0.1 to 5% by weight.

The binding agent may be added by spraying into a raw material powder, and the binding agent may be sprayed while mixing the raw material powder, or may be sprayed after mixing the raw material powder, but not particularly limited. As one example, the amount of treatment may be increased so that the residual quantity of the binding agent is 0.1 to 5% by weight, since the residual quantity is not large in case of a volatile alcohol or an aqueous solution comprising thereof, and for example, the added amount may be 10 to 20% by weight in the total weight of the mixed saccharide granule.

Another embodiment of the present invention relates to a method for preparing a mixed saccharide granule comprising a step of granulating by adding a binding agent into (a) the first saccharide powder containing psicose, and (b) the second saccharide powder which has 30 to 170 of a ratio of an average particle diameter, based on 100 of an average particle diameter of the first saccharide powder, and is one or more kinds selected from the group consisting of monosaccharides other than psicose and disaccharides.

The properties of the obtained mixed saccharide granule are as same as described above. Specifically, the average particle diameter of the prepared mixed saccharide granule may be 100 to 200 based on 100 of the average particle diameter of the first saccharide powder, or hygroscopicity of the mixed saccharide granule may be 90 or less, for example 50 to 90, based on 100 of hygroscopicity of psicose powder, or the flowability of the mixed saccharide granule may be 120 to 200 based on 100 of flowability of psicose powder.

In one example of the present invention, it is further preferable to use a fluidized bed granulator, since the granulating process may be conducted by mixing and drying a raw material powder in a mixer thereby conducting granulation, or by fluidizing a raw material powder in a fluidized bed granulator. In the fluidized bed granulator, when a binding agent is added in a state where the powder moves from the bottom to the top, granules are formed as surfaces of many fluidized powders melt due to the force (frictional force) that the raw material powder moves upward and downward and powders are bonded to each other, and in addition, flowability is further improved as surfaces of granulated fluidized powders are smooth due to friction.

In one example of the present invention, in case of conducting granulation by mixing and drying a raw material powder in a mixer, it may be carried out by mixing the first saccharide powder and the second saccharide powder and hot air drying at a temperature in the range of 40 to 70° C. (for example, 45° C. (Example 3)).

In another example, in case of conducting granulation by fluidizing the first saccharide powder and the second saccharide powder in a fluidized bed granulator while spraying a binding agent, a raw material powder may be fluidized by providing an air of 25 to 50% RH, 40 to 70° C. of temperature and 30 to 150 m³/h of pressure to the fluidized bed granulator.

In another example of the present invention, a food composition comprising the mixed saccharide granule may be provided, and the mixed saccharide granule is advantageous in that it has not only low hygroscopicity, improved flowability but also improved sweetness quality compared with single psicose, and thus it can be used for the same use as sugar or sweetener, and it can be applied to various foods.

Specifically, it can be used for generally sweetened foods such as beverages, candies, ices, yogurt, chocolates, etc., and particularly, it can be properly used as a composition for giving sweetness in a powdery form of food group. The content of the mixed saccharide granule in the food composition may be 0.01 to 50% by weight.

Effect of the Invention

The present invention can compensate for the problems that may occur during packaging, distribution, or long-term storage of powdered products, by preparing a mixed saccharide granule of psicose with other saccharides, thereby maintaining uniformity of granular sweetness quality and properties and preventing reseparation, and improving flowability and hygroscopicity. In addition, it is possible to provide a psicose mixed composition with improved sweetness quality, by complementing the problem that the increase in sweetness of the psicose is delayed sensually and the bitter taste (bad taste) is felt at the tail.

BRIEF DESCRIPTION OF DRAWINGS

FIG. 1 is a scanning electron microscope (SEM) photograph measuring the psicose powder obtained in Preparative Example 1 of the present invention at magnification ×100.

FIG. 2 is a stereoscopic microscope photograph measuring the psicose powder obtained in Preparative Example 1 of the present invention at magnification ×400.

FIG. 3 is an X-ray diffraction pattern graph of the psicose crystal obtained in Preparative Example 1 of the present invention.

FIG. 4 is a stereoscopic microscope photograph measuring the mixed saccharide granule of psicose and anhydrous glucose according to one example of the present invention at magnification ×400.

FIG. 5 is a sweetness profile graph showing the result of sensory evaluation of the mixed saccharide granule of psicose and sugar according to one example of the present invention.

FIG. 6 is a sweetness profile graph showing the result of sensory evaluation of the mixed saccharide granule of psicose and glucose according to one example of the present invention.

FIG. 7 is a graph showing increment of flowability of a psicose-containing mixed saccharide granule according to one example of the present invention.

FIG. 8 is a graph showing increment of hygroscopicity of a psicose-containing mixed saccharide granule according to one example of the present invention with time.

FIG. 9 is a graph comparing hygroscopicity of a psicose-containing mixed saccharide granule according to one example of the present invention.

FIG. 10 is a diagram showing one example of a recombinant expression vector (pCES_sodCDPE) for preparing psicose syrup used in the present invention.

DETAILED DESCRIPTION OF THE EMBODIMENTS

The present invention will be described in more detail by the following examples, but it is not intended to limit the protection scope of the present invention by the following examples.

Preparative Example 1: Preparation of Psicose 1-1: Preparation of a Strain Producing Psicose An encoding gene of a psicose epimerase derived from *Clostridium scindens* (*Clostridium scindens* ATCC 35704) (DPE gene; Gene bank: EDS06411.1) was synthesized as a modified form of polynucleotide by optimizing for *E. coli* and called CDPE. The polynucleotide optimized for *E. coli* (SEQ ID NO: 2) and sod promoter and T7 terminator obtained from pET21a vector were obtained as each template through PCR, and these were linked as one template by overlap PCR method and cloned into pGEM T-easy vector through T-vector cloning, thereby confirming sod promoter (SEQ ID NO: 1), optimized CDPE sequence (SEQ ID NO: 8) and a sequence of a polynucleotide comprising T7-terminator.

The entire confirmed polynucleotide was inserted into the same restriction enzyme site of an expression vector pCES208 (J. Microbiol. Biotechnol., 18:639-647, 2008) using restriction enzymes NotI and XbaI(NEB), and a recombinant vector pCES208/psicose epimerase (pCES_sodCDPE) was prepared. The cleavage map of the prepared recombinant vector (pCES_sodCDPE) was shown in FIG. 10.

*Corynebacterium glutaricum* was transformed with the prepared recombinant vector (pCES_sodCDPE) plasmid using electroporation. Colonies were picked and inoculated in 4 ml of LB medium (tryptone 10 g/L, NaCl 10 g/L, yeast extract 5 g/L) supplemented with Kanamycin at a final concentration of 15 ug/ml, and then cultured for approximately 16 hrs at the culture conditions of 30° C. and 250 rpm. Then, 1 ml of the culture was collected and inoculated in 100 ml LB medium comprising 15 ug.ml of Kanamycin, and the culture was continued for over 16 hrs.

After lysis of cells cultured using beadbeater, only supernatant is obtained and mixed with a sample buffer as 1:1, and then heated at 100° C. for 5 minutes. The prepared samples were subjected to electrophoresis on a 12% SDS-PAGE gel (composition: running gel—3.3 ml H2O, 4.0 ml 30% acrylamide, 2.5 ml 1.5M Tris buffer (pH 8.8), 100 μl 10% SDS, 100 μl, 10% APS, 4 μl TEMED/stacking gel—1.4 ml H2O, 0.33 ml 30% acrylamide, 0.25 ml 1.0M Tris buffer (pH 6.8), 20 μl 10% SDS, 20 μl 10% APS, 2 μl TEMED) at 180V for approximately 50 minutes, and the protein expression was confirmed.

After the expression of CDPE was confirmed on the SDS-PAGE gel, His-tag purification was proceeded using Ni-NTA resin for accurate measurement of expression level, and the expression rate was calculated using a calculation formula (expression rate (%)=(Purified protein (mg)/Total soluble protein (mg))×100). The prepared transformed *Corynebacterium glutaricum* produced 16.62 mg of the total water-soluble proteins and 1.74 mg of purified enzyme proteins.

1-2: Preparation of Psicose Syrup

In order to prepare psicose from fructose using the recombinant strain producing psicose epimerase obtained from Preparative Example 1-1, cells were collected by centrifugation in the strain culture. Then, the cell suspension was treated with 0.05% (v/v) of en emulsifier (M-1695) in a final volume and treated at 35° C. (±5° C.) for 60 minutes. The microbial cells in which the reaction was completed were collected after the supernatant comprising the emulsifier was removed again using a centrifuge.

For the preparation of immobilized beads, the collected microbial cells were mixed with D.W. to a final microbial cell concentration of 5% (v/v), and 4% (v/v) of alginic acid dissolved in water and 5% (v/v) of the collected microbial cells were mixed at 1:1, and it was refrigerated at 4° C. to remove bubbles generated during mixing. The refrigerated mixture solution was injected through Neddel (inner diameter 0.20 to 0.30 mm) and formed into a droplet shape, and dropped by weight, and the dropped mixture solution was dropped into a previously prepared 100 mM calcium chloride ($CaCl_2$) solution and cured, and spherical or elliptical beads (diameter 2.0 to 2.2 mm) were formed. The formed beads were soaked in a 100 mM calcium chloride solution and mixed evenly by a stirrer so as to be further cured.

After all the mixture solution was injected, the beads were further cured while being refrigerated for 4 to 6 hrs, and then cured for approximately 6 hrs in a refrigerated state by replacing a new 100 mM calcium chloride solution. After beads completely cured were skimmed and moisture was completely removed, water was added 3 times as much as the volume of the beads and then it was stirred for 10 minutes, and the calcium chloride solution was removed by treating the beads with this process 3 times.

After completely removing water from the washed beads for manganese soaking, 40 brix (%) the reaction substrate comprising 10 mM manganese was added at 3 times volume of bead volume, and then stirred for 10 minutes, and it was replaced with the reaction substrate comprising 10 mM manganese by repeating this treatment 3 times or more. The reaction substrate was adjusted to pH 6.8 to 7.2 with 3N NaOH, and liquid fructose or crystalline fructose can be the substrate depending on the kind of product. The beads completely soaked have a reduced diameter of approximately 1.6 to 1.8 mm and its strength was also increased. After removing the substrate of beads completely soaked, they were filled in an immobilized reaction column and then used for the production of a psicose syrup.

<Immobilized Column Reaction Conditions>

Reaction temperature: internal temperature of the column jacket 50° C.

Substrate flow rate: 0.5 SV (space velocity $L.h^{-1}$)

Reaction substrate: crystalline fructose 40 brix, pH 6.8 to 7.2,

Bead preparation: 2.5% (w/w) microbial cells, 2% (w/w) alginic acid mixture and 10 mM $Mn^{2+}$ soaking To the immobilized reaction column, a raw material whose raw material solution comprised 75% of solid and the fructose content was 92 parts by weight when the total solid content was 100 parts by weight was provided, thereby preparing a psicose syrup. The 25 (w/w) % psicose syrup in which the weight ratio of glucose:fructose:psicose:oligosaccharide is 6:67:25:2 was collected from the reaction solution.

1-3: Preparation of Psicose Powder

In order to remove impurities such as color and ion components, the psicose syrup obtained from Preparative Example 1-2 was passed through at a rate of 2 times (once or two times) volume of the ion exchange resin per hour in a column at the room temperature which was filled with resin in which anion exchange resin and cation and anion exchange resin were mixed and desalted, and then a high-purity psicose solution was separated and collected using chromatograph which was filled with an ion exchange resin of the calcium (Ca²⁺) type. The high-purity psicose syrup was concentrated at a concentration of 82 Bx (%, w/w) (80 to 83 Bx), and cooled from 35° C. (35° C. to 40° C.) of temperature to become a supersaturated state to 10° C. (10 to 15° C.) of temperature gradually, thereby forming crystals. The psicose crystals obtained in the crystallization step, in which psicose crystal seed was not added, were collected by drying after removing mother liquor by centrifugal dehydration and washing crystals with cooling water.

The average particle size of the obtained psicose crystal powder was 237 μm, and its range of particle diameter was distributed in 74 to 428 μm, and the crystal structure had a long rectangular parallelepiped shape with an orthorhombic system. The width×length diameter ratio of the rectangular parallelepiped crystal is 1×4 on average, and has a diameter in the range of 1×1.5 to 6.9. The scanning electron micrograph (SEM) photograph of the psicose crystal and the stereoscopic microscope photograph (×400 magnification) of the psicose crystal were shown in FIG. 1 and FIG. 2, and it was confirmed that the main diffraction angles (θ) were 15.35°, 18.83°, 30.95° and 47.15° by analyzing X-ray diffraction patterns from the crystal, which were shown in FIG. 3.

Example 1: Preparation of Mixed Granule of Psicose and Glucose 1-1: Use of Anhydrous Glucose with 295 μm of the Average Particle Size After mixing 150 g of each psicose powder prepared in Preparative Example 1-3 and anhydrous glucose powder in which the average particle size was 295 μm to be the weight ratio (w/w) of 1:1, the powder was put into a fluidized bed granulator dryer (FBS, manufactured by HÜTTLIN, Germany) set at the conditions of InLet temperature 50° C., OutLet temperature 40° C., and Air pressure 30 m²/h, thereby preparing a granule and drying. At this time, in order to from a granule well, the binding solution was sprayed for 15 minutes at a speed of 10 rpm as much as 10 to 20% volume of the total weight of the total mixed powder weight with a fermentation alcohol having a purity of 95% or more. The alcohol was advantageous in that it was volatilized when sprayed and did not exist in the powder, so it did not affect the content. After the internal temperature was slowly cooled to below 30° C. when all alcohols were sprayed, the granular powder was taken out of the equipment and collected. A stereoscopic microscope photograph (×400 magnification) of the obtained mixed granular powder of psicose and anhydrous glucose was shown in FIG. 4.

1-2: Use of Hydroglucose with 261 μm of the Average Particle Size

After mixing 150 g of each the psicose powder prepared in Preparative Example 1-3 and a hydroglucose in which the average particle size is 261 μm in a ratio of 1:1 (w/w), a granule was prepared in substantially the same manner as Example 1-1.

Example 2: Preparation of Mixed Granule of Psicose and Sugar 2-1: Use of Powdered Sugar with 72 μm of the Average Particle Size After mixing 150 g of each the psicose powder prepared in Preparative Example 1-3 and a powder sugar (which is prepared by pulverizing sugar and is disclosed in Table 2) in which the average particle size is 72 μm in a ratio of 1:1 (w/w), a granular powder was prepared in the same manner as Example 1.

2-2: Use of Ultra-Finely Granulated Sugar with 230 μm of the Average Particle Size After mixing 150 g of each the psicose powder prepared in Preparative Example 1-3 and a ultra-finely granulated sugar (caster sugar) in which the average particle size is 230 μm in a ratio of 1:1 (w/w), a granular powder was prepared in the same manner as Example 1.

2-3: Use of Finely-Granulated Sugar with the Average Particle Size is 392 μm

After mixing 150 g of each the psicose powder prepared in Preparative Example 1-3 and a finely-granulated sugar in which the average particle size is 392 μm in a ratio of 1:1 (w/w), a granular powder was prepared in the same manner as Example 1.

2-4: Use of Granulated White Sugar with 684 μm of the Average Particle Size

After mixing 150 g of each the psicose powder prepared in Preparative Example 1-3 and a granulated white sugar (general sugar) in which the average particle size is 684 μm in a ratio of 1:1 (w/w), a granular was prepared in the same manner as Example 1.

Example 3: Preparation of Mixed Granule of Psicose and Sugar using Binding Agent In order to form granules between powder particles evenly, as binding agents, DE12 maltodextrin, natural water-soluble dietary fiber, modified starch, and hydroxypropyl methylcellulose (HPMC) were prepared. A solution was prepared by dissolving maltodextrin into water to be 30 Bx concentration, and a solution was prepared by dissolving indigestible maltodextrin as a natural water-soluble dietary fiber into water to be 30 Bx concentration, and a solution was prepared by dissolving alpha-starch as a modified starch into water to be 10% concentration, and a solution was prepared by dissolving HPMC into a fermentation alcohol having a purity of 95% to be 5% by weight concentration.

50 g of each psicose powder prepared in Preparative Example 1-3 and sugar, caster sugar, in which the average particle size was 230 μm, were mixed to be the weight ratio of 1:1. After adding the prepared binding agent solution to the mixture, particles in the powder form were bound by passing through a 20 mesh sieve. In this state, after hot air drying at 45° C. for 30 to 50 minutes, granules were sieved evenly and collected. As the prepared binding agent solution, maltodextrin, indigestible maltodextrin and HPMC were added so that the final content of the binding agent in the total weight of granules was 1% by weight, and alpha-starch was added so that the final content of the binding agent in the total weight of granules was 0.2% by weight.

Test Example 1: Analysis of Particle Size of Powder

Particle size analysis equipment (equipment name Mastersizer 2000, manufacturer Malvern) is to measure the size of particle using laser diffraction technology, and it is analyzed in the manner of calculating the particle size by measuring the intensity of light scattered when the laser beam passes the dispersed fine particle sample. The particle size of each mixed ingredient was measure using the equipment, and the result was disclosed in the following Table 2.

TABLE 2

| Saccharides | Average particle size (μm) | Ratio of average particle size (compared with psicose) | Particle size distribution (μm) |
|---|---|---|---|
| Psicose crystal | 237 | 1.0 (standard) | 74-428 |
| Sugar (granulated white sugar) | 684 | 2.9 | 336-1125 |
| Sugar (finely-granulated sugar) | 392 | 1.7 | 235-580 |
| Sugar (ultra-finely granulated sugar) | 230 | 0.9 | 126-356 |
| Sugar (powdered sugar) | 72 | 0.3 | 9-142 |
| Glucose (anhydrous) | 295 | 1.2 | 75-530 |
| Glucose (hydrated) | 261 | 1.1 | 79-512 |

Test Example 2: Analysis of Mixing Level of Mixed Granule

The sugar composition of each sample was confirmed by partially collecting granules of three portions of top, middle and bottom, and analyzing by high performance liquid chromatography, after placing the granular powder prepared in Example 1-1 and Example 1-2 in a bag and vibrating for 10 minutes in a vibrator. The result was shown in Table 3 and Table 4. It was determined that the granular sugar was uniformly mixed well to a level that the deviation of sugar composition was 1% or less between mixed ingredients in the granular powder.

TABLE 3

| Sugar composition (%) | Example 1-1 | Example 1-2 |
|---|---|---|
| Psicose | 49.1 | 50.7 |
| Glucose | 50.9 | 49.3 |
| Sugar composition deviation | ±0.4 | ±0.2 |
| Mixing level | ⊙ | ⊙ |

(Mixing level: very high -⊙, high-○, low- (X))

As shown in Table 3, it was confirmed that a granular powder particle having less compositional deviation and uniform composition could be prepared than the simply "mixing" method, as granules were well formed by the binding solution, since the average particle size ratio of the two ingredients to be mixed was psicose:glucose=1.0:1.1 to 1.2 (refer to Table 2) in Example 1, and the particle size between the two ingredients was similar.

TABLE 4

| Ingredient composition | Example 2 | | | | Example 3 | | | |
|---|---|---|---|---|---|---|---|---|
| (wt %) | 2-1 | 2-2 | 2-3 | 2-4 | 3-1 | 3-2 | 3-3 | 3-4 |
| Psicose | 50.9 | 49.3 | 51.0 | 40.1 | 51.4 | 50.2 | 51.0 | 50.6 |
| Sugar | 49.1 | 50.7 | 49.0 | 59.9 | 47.8 | 49.6 | 48.8 | 48.9 |
| Binding agent | — | — | — | — | 0.8 | 0.2 | 0.2 | 0.5 |
| Sugar composition deviation | ±0.9 | ±0.3 | ±1.0 | ±4.3 | ±0.8 | ±0.1 | ±0.5 | ±0.4 |
| Mixing level | ○ | ⊙ | ○ | X | ○ | ⊙ | ○ | ⊙ |

(Mixing level: very high—⊙, high—○, low—(X))

In Example 2-4, it was difficult to prepare the mixed granular powder with uniform composition even when using a binding solution, since the average particle size of sugar was more than 4 times larger than psicose. However, except Example 2-4, it was confirmed that a granular powder with less compositional deviation and uniform composition could be prepared in the mixed granular powder (Example 2-1, 2-2, 2-3), which is within the range of psicose:sugar=1.0: 0.3~1.7.

In addition, as a result of preparing a mixed granule of psicose and sugar according to the kinds of binding solutions in Example 3, it was confirmed that a granular powder with uniform composition could be prepared, since mostly a granule was well formed, although there was a slight difference according to the kinds of binding solutions.

Test Example 3: Sensory Evaluation of Psicose Mixed Granular Powder

Granular powder samples for sensory evaluation of the mixed saccharide granules of psicose and sugar were prepared by a simple granulation method using a binding solution as a fermentation alcohol. The powder of psicose of Example 1-3 was mixed with sugar, caster sugar to be a ratio of 9:1, 7:3, 5:5 (w/w) respectively. After adding a fermentation alcohol with a purity of 95% to 5~10% of the weight by mixing 100 g each, particles in the powder form were bound each other by passing through a 20 mesh sieve. In this state, after hot air drying at 45° C. for 30 to 60 minutes, granules were sieved evenly and collected. The collected mixed saccharide was named SP91, SP73 and SP55 according to the ratio of 9:1, 7:3, 5:5 (w/w), according to the mixing ratio of psicose powder and sugar.

Granular powder samples for sensory evaluation of the mixed saccharide granules of psicose and glucose were prepared by a simple granulation method using a binding solution as a fermentation alcohol. The powder of psicose of Example 1 was mixed with anhydrous glucose to be a ratio of 7:3, 5:5 3:7 (w/w) respectively. After adding a fermentation alcohol with a purity of 95% to 5~10% of the weight by mixing 100 g each, particles in the powder form were bound each other by passing through a 20 mesh sieve. In this state, after hot air drying at 45° C. for 30 to 60 minutes, granules were sieved evenly and collected. The collected mixed saccharide was named GP73, GP55 and GP37 according to the ratio of 7:3, 5:5, 3:7 (w/w), according to the mixing ratio of psicose powder and anhydrous glucose.

Sensory evaluation of granular powder samples in which sugar or glucose was mixed with psicose was performed. Each sample was provided by collecting 0.7 g each and it was represented by three digit number randomly extracted using a random number table. The order of providing samples was always randomly decided and lukewarm water for rinsing mouth was provided together to test personnel. The sensory test room maintained a constant temperature (25±1° C.) and no odor.

15 panelists who had a high level of understanding of sensory evaluation and had experience in sensory test were selected as the sensory test personnel. Training was conducted three times a week for 1 month, and took an average of 30 minutes per training session. As the content and method of evaluation, sensory properties of psicose mixed saccharide were evaluated as sweet taste, sour taste, bitter taste, refreshing sensation and continuity of sweet taste, and 15 cm line scale was used.

The values of the sensory evaluation result were shown in the following Tables 5 and 6, and the graph of sweetness profile of the sensory evaluation result was shown in FIG. 5 and FIG. 6. Table 5 is the result of sensory evaluation of psicose/sugar mixed saccharide, and Table 6 is the result of sensory evaluation of psicose/glucose mixed saccharide.

TABLE 5

| | Sweet taste | Bad taste | Sour taste | Bitter taste | Refreshing sensation | Continuity of sweet taste |
|---|---|---|---|---|---|---|
| Sugar | 10.0 | 1.5 | 1.5 | 1.5 | 5.0 | 5.0 |
| Psicose | 7.3 | 6.0 | 4.2 | 5.1 | 10.0 | 8.2 |
| SP91 | 9.8 | 5.1 | 2.7 | 3.6 | 4.5 | 9.5 |
| SP73 | 9.2 | 5.4 | 3.0 | 3.8 | 6.5 | 8.7 |
| SP55 | 8.3 | 5.6 | 3.0 | 4.4 | 8.9 | 8.6 |

TABLE 6

| | Sweet taste | Bad taste | Sour taste | Bitter taste | Refreshing sensation | Continuity of sweet taste |
|---|---|---|---|---|---|---|
| Glucose | 8.6 | 5.3 | 3.4 | 3.3 | 4.1 | 7.3 |
| Psicose | 7.3 | 6.0 | 4.2 | 5.1 | 10.0 | 8.2 |
| GP73 | 9.4 | 4.9 | 3.3 | 4.0 | 5.3 | 9.0 |
| GP55 | 8.8 | 5.1 | 4.0 | 4.3 | 7.0 | 8.3 |
| GP37 | 7.8 | 5.0 | 3.8 | 4.6 | 8.2 | 8.6 |

Improvement of sweetness quality is needed, since psicose has sweetness equivalent to 70% of sugar, but it has late sweetness increase or bitter taste or bad taste at the tail. Therefore, by mixing sugar or glucose at a certain ratio, a sweetener with improved taste can be provided by overcoming disadvantages of sweetness quality of psicose. As shown in the table of result of sensory evaluation, it was demonstrated that sweet taste was increased than psicose alone, and bad taste and bitter taste were alleviated, and particularly continuity of sweet taste was significantly increased than the conventional sugar, due to mixing of psicose and sugar. In addition, it was confirmed that sweet taste seemed to be stronger than psicose and glucose alone, respectively, and bad taste and bitter taste were alleviated to the level similar to the conventional glucose than psicose alone, because of mixing psicose and glucose. Especially, it was confirmed that continuity of sweet taste was significantly increased than the conventional sugar and glucose. It was judged that sweet taste was continued long and sweet taste was also felt strongly, because the refreshing sensation was magnified immediately upon ingestion, thereby complementing unique bad taste and bitter taste of psicose, and the late increase of sweetness caused synergy with sweet taste of sugar or glucose.

Test Example 4: Physical Properties of Psicose Mixed Saccharide Granule (1) Evaluation of Flowability 20 g of the sample was precisely weighed and placed in a funnel for measurement (Orifice 1.55 mm), and the time (second) in which all 20 g of the sample flowed down on the weighing scale, and the result was shown in the following Table 7 and FIG. 7. (e.g. Flow Properties Tests—flow through an orifice, angle of repose, shear cell)

TABLE 7

| Sample | Average value of flowability (g/sec) | Deviation (g/sec) | Percentage (%) |
|---|---|---|---|
| Psicose | 3.78 | ±0.37 | 100.0 |
| Example 1-1 | 5.81 | ±0.23 | 153.8 |
| Example 1-2 | 4.54 | ±0.19 | 120.1 |
| Example 2-2 | 5.97 | ±0.15 | 158.1 |
| Example 2-3 | 5.72 | ±0.21 | 151.5 |

It was confirmed that the flowability of the mixed granular powder with respect to the single psicose powder was improved to the level of 120 to 159% or more than psicose. As the flowability was improved, a company shipping particular or powdery products could be offered many benefits in the packaging and distribution steps.

(2) Evaluation of Hygroscopicity 3 g of each sample was placed in a dish and stored in a thermohygrostat at a temperature of 40° C. and a relative humidity of 60±3% for 150 minutes, and the weight of each sample was measured after 50 min, 70 min and 150 min, and the result was shown in FIG. 8 and FIG. 9. In addition, in order to compare hygroscopicity increment ratio at the same time, after being stored in the thermohygrostat at the same conditions, the weight of each sample was measured and hygroscopicity increment was shown in the following Table 8 by converting hygroscopicity based on 100% of single psicose powder.

TABLE 8

| Sample | Hygroscopicity increment (g) | Percentage (%) | Percentage deviation (%) |
|---|---|---|---|
| Psicose | 0.3356 | 100.0 | — |
| Example 1-1 | 0.2850 | 85.2 | ±1.26 |
| Example 1-2 | 0.2580 | 77.0 | ±3.56 |
| Example 2-2 | 0.2952 | 88.2 | ±5.47 |
| Example 2-3 | 0.2011 | 60.4 | ±10.09 |

As a result of comparing hygroscopicity of each sample in the graph of hygroscopicity increment of FIG. 8, the hygroscopicity of the mixed saccharide granule exhibited low hygroscopicity of 84 to 56% or less based on 100% of single psicose powder. That hygroscopicity was low means that the risk of caking phenomenon that the powder is hardened or dampening depending on the surrounding environment was lowered, when the powdery product was shipped and stored for a long period.

Test Example 5: Differential Scanning Calorimeter (DSC) Analysis of Mixed Saccharide Granule and Composed Sugar Powder In order to confirm that the prepared mixed saccharide granule was the mixed granule of the sugar powder in which chemical properties of the constitutional sugar powder of the mixed saccharide were maintained intact, differential scanning calorimeter (DSC) analysis method that can determine physical and chemical properties of samples from temperature and calorie change data (peak position, shape, number, area, etc.), which were obtained from energy provided into the assay samples of the mixed saccharide granule prepared in Example 1-1 and Example 2-2 and single material of each constitutional ingredient which composes that, was performed. The sample used for DSC measurement was as follows.

TABLE 9

| Assay sample | Detailed description |
|---|---|
| Psicose powder | Preparative Example 1-3 |
| Glucose powder | Anhydrous glucose powder with 295 μm of the average particle size, used for preparation of the mixed saccharide granule of Example 1-1 |
| Sugar powder | ultra-finely granulated sugar with 230 μm of the average particle size, used for preparation of the mixed saccharide granule of Example 2-2 |
| Mixed saccharide granule of psicose and glucose | Mixed saccharide granule obtained in Example 1-1 |
| Mixed saccharide granule of psicose and sugar | Mixed saccharide granule obtained in Example 2-2 |

The following DSC (differential scanning calorimeter) equipment and analysis information were used, and the result was shown in Table 10.

Equipment name: DSC [differential scanning calorimeter]
Manufacturer: Perkin Elmer
Model name: Diamond DSC
Analysis conditions: room temperature (RT) to 250° C. 10° C./min temperature rising, N2 gas purge, (standard method: refer to USA standard test method ASTM D 3418.)

TABLE 10

| Assay sample | Endothermic peak temperature(Tg, ° C.) |
|---|---|
| Psicose powder | 109.0 |
| Glucose powder | 162.2 |
| Sugar powder | 192.2 |
| Mixed saccharide granule of psicose and glucose (Example 1-1) | Psicose: 109.4 Glucose: 159.4 |
| Mixed saccharide granule of psicose and sugar (Example 2-2) | Psicose: 109.4 Sugar: 159.4 |

As shown in Table 10, it was demonstrated that distinct endothermic peaks of two mixed ingredients were detected in case of the mixed saccharide granules of the present invention. That is, the result of analyzing the sugar powder which is comprised in the mixed saccharide granule of the present invention alone and the result of constitutional ingredient which is comprised in the mixed saccharide all exhibited the same endothermic peak temperature, and this means that physical/chemical properties of each constitutional ingredient were maintained intact in the mixed saccharide granule.

The invention claimed is:

1. A mixed saccharide granule comprising;
   (a) a first psicose powder; and
   (b) a second saccharide powder which has 30 to 170 of a ratio of an average particle diameter, based on 100 of an average particle diameter of the first psicose powder, and is at least one selected from the group consisting of disaccharides, and monosaccharides other than psicose,
   wherein relative hygroscopicity of the mixed saccharide granule is 90 or less, based on 100 of hygroscopicity of the first psicose powder.

2. The mixed saccharide granule of claim 1, wherein the flowability of the mixed saccharide granule is 120 to 200, based on 100 of the flowability of the psicose powder.

3. The mixed saccharide granule of claim 1, wherein the mixed weight ratio of the first psicose powder and the second saccharide powder (the first psicose powder: the second saccharide powder) is 70:30 to 5:95.

4. The mixed saccharide granule of claim 1, wherein the average particle diameter of the mixed saccharide granule is 100 to 250, based on 100 of the average particle diameter of the first psicose powder.

5. The mixed saccharide granule of claim 1, wherein the second saccharide powder is at least one saccharides selected from the group consisting of glucose, sucrose, lactose, maltose, galactose, tagatose, xylose, mannose, allose and fructose.

6. The mixed saccharide granule of claim 1, wherein the mixed saccharide granule further comprises a binding agent of saccharide powders.

7. The mixed saccharide granule of claim 6, wherein the binding agent is one or more kinds selected from the group consisting of water, $C_1$-$C_6$ alcohol, aqueous solution of $C_1$-$C_6$ alcohol, maltodextrin, indigestible maltodextrin, Hydroxypropyl methylcellulose (HPMC) and starch.

8. The mixed saccharide granule of claim 6, wherein the mixed saccharide granule comprises 0.1 to 5% by weight of the binding agent in the total weight of the mixed saccharide granule.

9. A method for preparing the mixed saccharide granule of claim 1 comprising,
   preparing a mixed saccharide granule by granulating (a) a first psicose powder; and (b) a second saccharide powder which has 30 to 170 of a ratio of an average particle diameter, based on 100 of an average particle diameter of the first psicose powder, and is at least one selected from the group consisting of disaccharides, and monosaccharides other than psicose,
   wherein an average particle diameter of the mixed saccharide granule is 100 to 200, based on 100 of an average particle diameter of the first psicose powder, and relative hygroscopicity of the mixed saccharide granule is 90 or less, based on 100 of hygroscopicity of a psicose powder.

10. The method for preparing a mixed saccharide granule of claim 9, wherein the granulating step is carried out by adding a binding agent.

11. The method for preparing a mixed saccharide granule of claim 9, wherein the granulating step is carried out by mixing the first psicose powder and the second saccharide powder and hot air drying at a temperature in the range of 40 to 70° C.

12. The method for preparing a mixed saccharide granule of claim 9, wherein the granulating step is carried out by fluidizing the first psicose powder and the second saccharide powder in a fluidized bed granulator with spraying a binding agent.

13. The method for preparing a mixed saccharide granule of claim 12, wherein dry air provided to the fluidized bed granulator is 20 to 50% RH, 40 to 70° C. of temperature and 30 to 150 m$^3$/h of pressure.

14. The method for preparing a mixed saccharide granule of claim 9, wherein the mixed weight ratio of the first psicose powder and the second saccharide powder (the first psicose powder: the second saccharide powder) is 70:30 to 5:95.

15. The method for preparing a mixed saccharide granule of claim 9, wherein a binding agent is added so that the content of the binding agent in the total weight of the mixed saccharide granule is 0.1 to 5% by weight.

16. The method for preparing a mixed saccharide granule of claim 10, wherein the binding agent is one or more kinds selected from the group consisting of water, $C_1$-$C_6$ alcohol, aqueous solution of $C_1$-$C_6$ alcohol, maltodextrin, indigestible maltodextrin, hydroxypropyl methylcellulose (HPMC) and starch.

\* \* \* \* \*